(12) United States Patent
Murphy (10) Patent No.: US 9,159,241 B1
(45) Date of Patent: Oct. 13, 2015

(54) METHODS, SYSTEMS, AND APPARATUS FOR SYNTHETIC INSTRUMENT LANDING SYSTEM (SILS)

(75) Inventor: Timothy A. Murphy, Everett, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 13/446,853

(22) Filed: Apr. 13, 2012

Related U.S. Application Data (60) Provisional application No. 61/476,120, filed on Apr. 15, 2011.

(51) Int. Cl.
| | |
|---|---|
| *G01S 1/00* | (2006.01) |
| *G01S 19/03* | (2010.01) |
| *G01C 21/00* | (2006.01) |
| *G01C 21/04* | (2006.01) |
| *G01C 23/00* | (2006.01) |
| *G08G 5/02* | (2006.01) |
| *G08G 5/00* | (2006.01) |
| *G01S 19/51* | (2010.01) |
| *G01S 19/15* | (2010.01) |
| *B64D 45/04* | (2006.01) |
| *G01S 13/91* | (2006.01) |
| *G01S 1/02* | (2010.01) |
| *G05D 1/06* | (2006.01) |

(52) U.S. Cl.
CPC . *G08G 5/02* (2013.01); *G01S 19/51* (2013.01); *G08G 5/0021* (2013.01); *B64D 45/04* (2013.01); *G01S 1/024* (2013.01); *G01S 13/91* (2013.01); *G01S 19/15* (2013.01); *G05D 1/0676* (2013.01)

(58) Field of Classification Search
None
See application file for complete search history.

(56) References Cited

U.S. PATENT DOCUMENTS

| | | | |
|---|---|---|---|
| 5,786,773 A | 7/1998 | Murphy | |
| 5,995,043 A | 11/1999 | Murphy | |
| 6,239,745 B1 * | 5/2001 | Stratton | 342/410 |
| 6,549,829 B1 | 4/2003 | Anderson et al. | |
| 6,674,398 B2 | 1/2004 | Murphy | |
| 6,950,036 B2 * | 9/2005 | Snodgrass et al. | 340/945 |
| 6,963,304 B2 | 11/2005 | Murphy | |
| 7,188,007 B2 | 3/2007 | Boorman et al. | |
| 7,256,710 B2 | 8/2007 | Mumaw et al. | |
| 7,321,318 B2 | 1/2008 | Crane et al. | |
| 7,362,262 B2 | 4/2008 | Murphy | |
| 7,373,223 B2 * | 5/2008 | Murphy | 701/16 |

(Continued)

OTHER PUBLICATIONS

Ackland et al., Global Navigation Satellite System: Landing System, Boeing, Technology/Product Development, Jan. 2003, pp. 1 to 9.*

*Primary Examiner* — Calvin Cheung
*Assistant Examiner* — Kevin P Mahne
(74) *Attorney, Agent, or Firm* — The Boeing Company; Brook Assefa (57) ABSTRACT

Methods, systems, and apparatus for Synthetic Instrument Landing System (SILS) are disclosed. By optimally integrating new SILS capabilities on existing aircraft systems and equipment, the systems, methods, and apparatus of this disclosure affect primarily one system, the MMR, and certain aircraft wiring reconfiguration and leave most of the other airplane systems as well as pilot (flight crew) training substantially unaffected. Unlike existing solutions that are based on a classical approach of new capability integration by providing associated new landing modes that are uniquely identified, the disclosure provides only a single mode to the pilot by moving all mode-specific functionality to onboard computers such as MMRs.

19 Claims, 8 Drawing Sheets

(56) References Cited

U.S. PATENT DOCUMENTS

| | | |
|---|---|---|
| 7,418,319 B2 | 8/2008 | Chen et al. |
| 7,460,029 B2 | 12/2008 | Boorman et al. |
| 7,751,948 B2 | 7/2010 | Boorman et al. |
| 7,970,503 B2 | 6/2011 | Lapp et al. |
| 2002/0070899 A1* | 6/2002 | Schulte et al. ................ 342/401 |
| 2003/0052800 A1* | 3/2003 | Snodgrass et al. ............ 340/945 |
| 2008/0297397 A1* | 12/2008 | Oberg ............................. 342/33 |
| 2010/0256840 A1* | 10/2010 | Call et al. ........................ 701/17 |
| 2011/0035080 A1 | 2/2011 | Murphy |
| 2011/0106345 A1* | 5/2011 | Takacs et al. ................... 701/17 |
| 2012/0026039 A1* | 2/2012 | Ganeshan et al. ....... 342/357.73 |

\* cited by examiner

METHODS, SYSTEMS, AND APPARATUS FOR SYNTHETIC INSTRUMENT LANDING SYSTEM (SILS)

RELATED PROVISIONAL APPLICATION

This application is related to and claims the benefit of priority of provisional U.S. Patent Application Ser. No. 61/476,120, filed Apr. 15, 2011, entitled "Methods, Systems, and Apparatus for Synthetic Instrument Landing System (SILS)", which is incorporated herein in its entirety by reference.

TECHNICAL FIELD

Aspects of the present disclosure are directed to apparatus, systems, and methods for Synthetic Instrument Landing System (SILS).

BACKGROUND

GNSS-based precision approach has been under development for over fifteen years and has begun to be used operationally. Currently, GNSS-based precision approach capability exists in the form of Ground Based Augmentation System (GBAS) based capability known as the GBAS Landing System (GLS) and also in the form of Satellite Based Augmentation System (SBAS) based precision approach. The latter capability is known as Lateral Performance with Vertical guidance (LPV). The airplane function that uses LPV guidance is also known as the Satellite Landing System (SLS).

At present, some of these systems have been deployed. However, proliferation of the GNSS-based precision approach capability has been hampered by implementation challenges on particularly on older airplane designs. Such implementation challenges include but are not limited to onboard equipment changes, wiring changes, cockpit interface changes, and even pilot training changes. In addition to making GNSS-based precision approach capability extant on a particular aircraft, the ultimate utility of GNSS-based precision approach depends on how much of the aircraft population has the capability. That is, if a sufficient percentage of the aircraft population is equipped with this capability, then such equipage rate can enable airspace reorganization for better efficiency. Therefore, enabling a large population of aircraft to have this capability sooner will make use of the capability to enhance airspace efficiency feasible sooner.

Thus, there is a need for methods, systems, and apparatus that address the aforementioned challenges as well as enable the proliferation of GNSS-based precision approach capabilities on all aircraft.

SUMMARY

One way of meeting this need is by systems, methods, and apparatus for a Synthetic Instrument Landing System (SILS) that provides a GNSS-based approach guidance that is substantially similar to ILS guidance. The present disclosure addresses this need via optimal equipment and aircraft redesign approach that imparts new SILS capabilities on existing aircraft systems and apparatus.

An embodiment of the disclosure includes a Synthetic Instrument Landing System (SILS) device operatively coupled to an aircraft display comprising means for receiving a frequency to be used for a precision approach; means for comparing the frequency to a plurality of SILS frequencies of an onboard database; means for selecting either a conventional ILS or a synthetic ILS based said comparing; and means for providing ILS-like deviations on at least one cockpit display based on said selection.

Another aspect of an embodiment of the disclosure is an airplane system for precision approach guidance comprising a computer having instructions having contents that perform a method that includes: (1) processing real-time airplane position information and distance to a runway facility; (2) mapping a plurality of ILS frequencies to GLS or SLS channel numbers in an onboard database; (3) processing a selected ILS frequency as either a conventional ILS frequency or a synthetic ILS frequency using the onboard database; and (4) processing a precision approach guidance information for display; and a display system operatively connected to the computer for providing approach guidance on at least one cockpit display.

A method for precision approach guidance for an aircraft comprises processing real-time airplane position information and distance to a runway facility; mapping a plurality of ILS frequencies to GLS or SLS channel numbers in an onboard database; processing a selected ILS frequency as either a conventional ILS frequency or a synthetic ILS frequency using the onboard database; processing a precision approach guidance information for display; and providing approach guidance on at least one cockpit display.

An onboard method for providing distance to a runway facility for a precision approach comprises processing distance as provided by a DME receiver; determining whether the precision approach is either an ILS approach or an SILS approach based on a pilot selected frequency; passing through DME-calculated distance for an ILS approach; responsive to the determination that the precision approach is not an ILS approach, calculating synthetic DME distance to the runway facility; and displaying the distance to the runway facility on at least one cockpit display.

It should be appreciated that this Summary is provided to introduce selected aspects of the disclosure in a simplified form that are further described below in the Detailed Description. This Summary is not intended to be used to limit the scope of the claimed subject matter. Other aspects and features of the present disclosure, as defined solely by the claims, will become apparent to those ordinarily skilled in the art upon review of the following non-limited detailed description of the disclosure in conjunction with the accompanying figures.

DETAILED DESCRIPTION

The following disclosure describes systems, methods, and apparatus for a Synthetic Instrument Landing System (SILS). Certain specific details are set forth in the following description and the figures to provide a thorough understanding of the various embodiments of the disclosure. Well-known structures, systems, and methods often associated with aircraft navigation, communication, control, display, and flight management systems have not been shown or described to avoid unnecessarily obscuring the description of the various embodiments of the disclosure. In addition, those of ordinary skill in the relevant art will understand that the additional embodiments of the present disclosure may be practiced without several of the details described below.

Many embodiments of the disclosure described below may take the form of computer-executable instructions, such as routines executed by a programmable computer. Those skilled in the relevant art will appreciate that the invention can be practiced on other computer system configurations as well. The disclosure can be embodied in a special-purpose computer or data processor that is specifically programmed, configured, or constructed to perform one or more of the computer-executable instructions described below. Accordingly, the term "computer" as generally used herein refers to any data processor that can be engaged in a cockpit, including computers for navigation radios such as MultiMode Receivers (MMR), ILS receivers, cockpit display systems, Flight Management Computers (FMC), Flight Control Computers (FCC), Electronic Flight Bags (EFB), laptops, tablet computers, or other hand-held devices.

The disclosure can also be practiced in distributed computing environments, in which tasks or modules are performed via remote processing devices that are linked through a communication network such as those enabled via datalink by the aircraft communication systems. In a distributed computing environment, program modules or subroutines may be located in both local and remote memory storage devices. Aspects of the disclosure described below may be stored or distributed on computer-readable media, including magnetic or optically readable computer disks (e.g., removable disks), as well as distributed electronically over networks, such networks including ground-based and satellite-based components of navigation systems. Data structures and transmission of data particular to aspects of the disclosure are also encompassed within the scope of the disclosure. Information handled in accordance with aspects of the disclosure can be presented on displays or display media, for example, CRT screens, LCD screens, head-up displays, touch screens, or other suitable display devices.

GNSS-based precision approach has been under development for over fifteen years and has begun to be used operationally. Currently, GNSS-based precision approach capability exists in the form of Ground Based Augmentation System (GBAS) based capability known as the GBAS Landing System (GLS) and also in the form of Satellite Based Augmentation System (SBAS) based precision approach. The latter capability is known as Lateral Performance with Vertical guidance (LPV). The airplane function that uses LPV guidance is also known as the Satellite Landing System (SLS).

At present, some of the aforementioned systems have been deployed. However, proliferation of the GNSS-based precision approach capability has been hampered by several implementation challenges such as but not limited to those described below. One challenge on all airplane designs, and more particularly on older airplane designs, is that the addition of such capability can affect a significant number of important airplane systems. Such implementation challenges include but are not limited to onboard equipment changes, wiring changes, cockpit interface changes, and even pilot training changes. For example, a typical full integration of GLS capability can require modifications to the Multi-mode Receiver (MMR), cockpit displays, Flight management System (FMS), autopilot, flight data recorder, Engine Indicating and Crew Alerting System (EICAS), navigation radio tuning panels, and Enhanced Ground Proximity Warning System (EGPWS).

A second challenge is associated with consistency of implementation across different aircraft types and impact to flight crew training. It is preferable for airlines to have cockpit devices, airplane systems, and also flight crew procedures for operating an airplane that are identical or substantially similar across the airlines' fleet such that flight crew training is minimized. Overcoming this challenge also has ancillary technical benefits such as reduced maintenance training for maintenance staff, simplified maintenance manuals, reduced spares requirements, and the like.

Lastly, in addition to making GNSS-based precision approach capability extant on a particular aircraft, the ultimate utility of GNSS-based precision approach depends on how much of the aircraft population has the capability. That is, if a sufficient percentage of the aircraft population is equipped with this capability, then such equipage rate can enable airspace reorganization for better efficiency. Therefore, enabling a large population of aircraft to have this capability sooner will make use of the capability to enhance airspace efficiency feasible sooner.

Thus, there is a need for methods, systems, and apparatus that address the aforementioned challenges as well as enable the proliferation of GNSS-based precision approach capabilities on all aircraft.

One way of meeting this need is by systems, methods, and apparatus for a Synthetic Instrument Landing System (SILS) that provides GNSS-based approach guidance that is substantially similar to ILS guidance. By utilizing the methods, systems, and apparatus of this disclosure, one is able to provide GNSS-based approach guidance that is substantially similar to ILS approach guidance with which pilots already are proficient.

In addition, the present disclosure addresses this need via optimal equipment and aircraft design approach that imparts new SILS capabilities on existing aircraft systems and apparatus. By utilizing the methods, systems, and devices of this disclosure, one may be able to simplify the on-aircraft design integration effort such that only the MMR is substantially modified when incorporating this capability onto aircraft.

Figure 4:
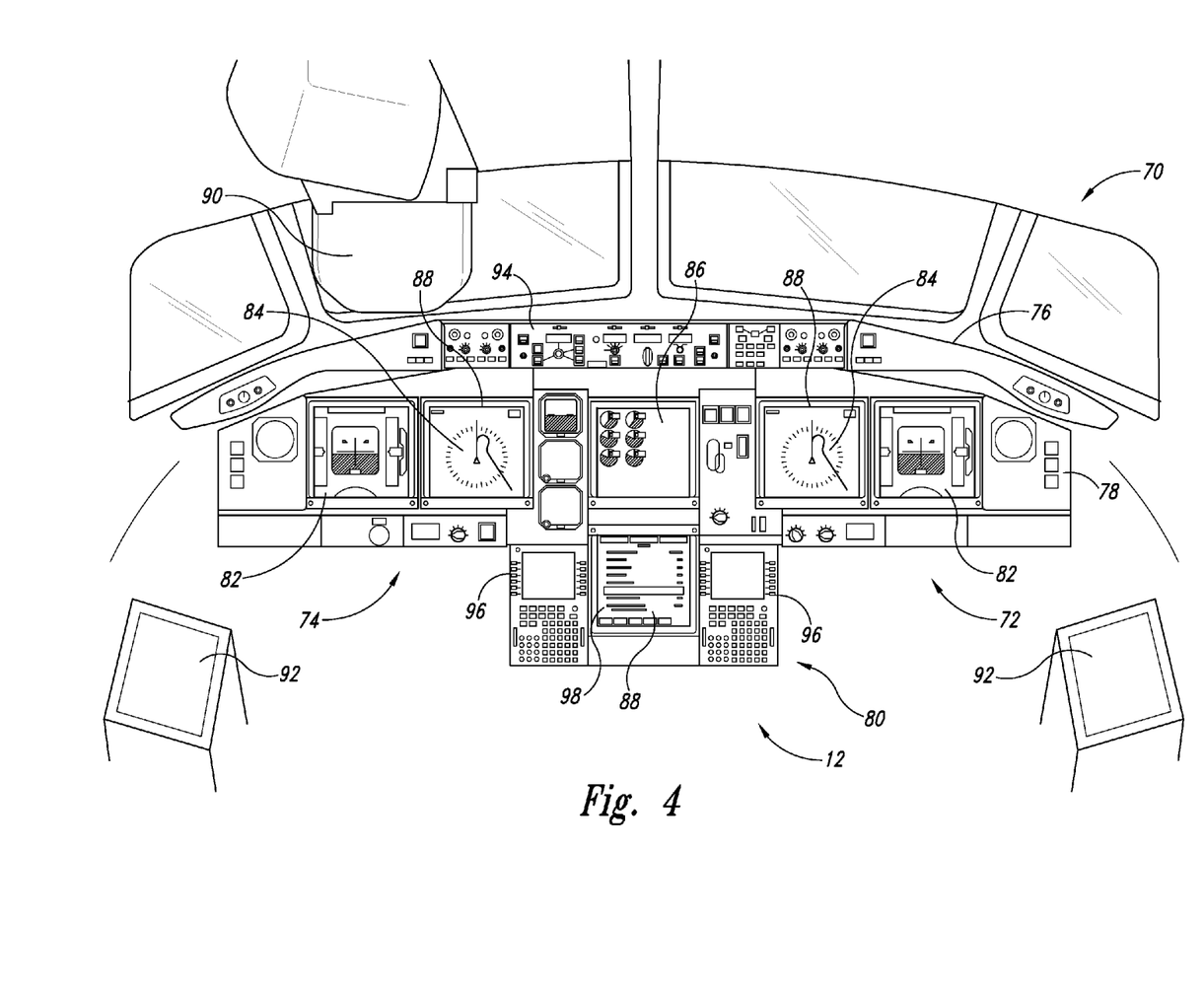
FIG. 4 is a diagram illustrating a more detailed arrangement of cockpit instruments that enable an advantageous embodiment according to the disclosure.

One embodiment of this disclosure is an SILS device operatively coupled to an aircraft display. Such device may also be coupled with means for selecting frequencies such as Control Input Devices 16, tuning panels 102 (FIG. 5), and Control Display Units (CDU) 96 (FIG. 4). Such device may have means for receiving a frequency to be used for a precision approach such as an ILS or MMR. The device may also have means for comparing the received frequency to a plurality of ILS and a plurality of SILS frequencies of an onboard database wherein the database may be a database stored on an FMS 14 (FIG. 1), an MMR 112 (FIG. 5), or other aircraft systems. The device may also have means for selecting either a conventional ILS or a synthetic ILS based on the aforementioned comparison. Such means for comparing and selecting frequencies may include databases, configuration tables, and non-transitory computer readable mediums of the SILS 12 (FIG. 1) or FMS 14 that enable comparison and selection of the correct frequency for the approach. Means for selecting frequencies may also include Control Input Devices 16, tuning panels 102 (FIG. 5), and Control Display Units (CDU) 96 (FIG. 4). Lastly, the device may include means for providing ILS-like deviation indicators such as visual indicators on cockpit displays such as Primary Flight Displays (PFD) 82 and Head-up Display (HUD) 90.

Before beginning the detailed description of the disclosure and the figures, it is important to note that those skilled in the relevant art understand how the ILS' ground portion including (1) a localizer antenna centered on the runway providing lateral guidance; (2) a glide slope antenna near the runway threshold for vertical guidance; and (3) marker beacons providing distance to the runway threshold function. In addition, how the onboard portion of an ILS including the guidance display provided to the pilots such as but not limited to indications as to whether the aircraft is to the left or right of the centerline, above or below the glide slope, or on the runway centerline and on the glideslope, etc., are indicated on cockpit displays such as a Primary Flight Display (PFD) 82, Head-up Display 90, and the like (see FIG. 4) are also well understood. See generally Ian Moir and Allan Seabridge, *Civil Avionics Systems*, AIAA (2003); U.S. Department of Transportation, Federal Aviation Administration (FAA), *Airman Information Manual (AIM)* (2010). Lastly, instrument approach charts and procedures for ILS and RNAV (GPS) are also well understood and are discussed in the publications such as the aforementioned FAA AIM and a detailed description of them is not necessary.

Figure 1:
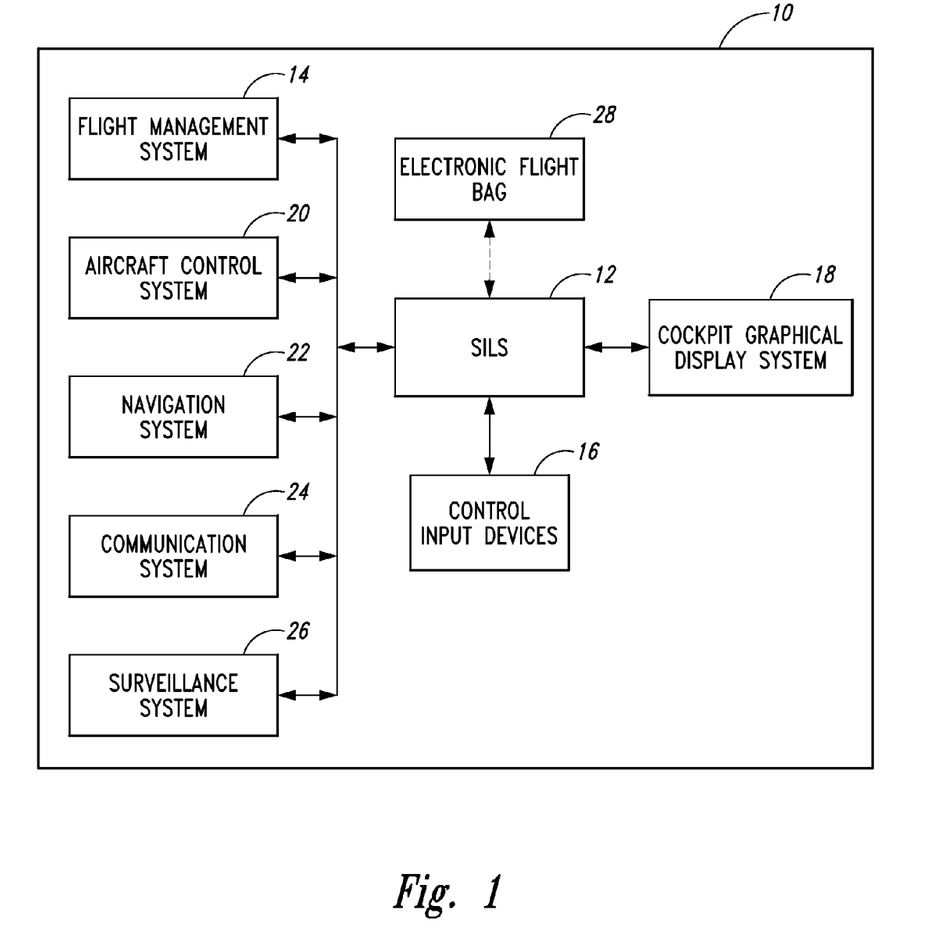
FIG. 1 is a schematic diagram of a generalized aircraft systems architecture centered on a Synthetic Instrument Landing System (SILS).

Turning now to a discussion of the disclosure and the figures, FIG. 1 depicts an embodiment of a generalized aircraft systems architecture 10 centered on an SILS 12. FIG. 1 has been simplified in order to make it easier to understand the present disclosure. Those skilled in the art will appreciate that FIG. 1 is one configuration of many that can be implemented for an embodiment of an SILS 12. For example, and without limitation, the SILS 12, or its components thereof, can be hosted on a number of on-board computers or devices suitable for the airplane configuration at hand such as the MMR (not shown), a dedicated SILS computer (not shown), a Flight Management System (FMS) 14, a Control Display Unit (CDU) 96 (see FIG. 4), or a cockpit graphical display system (CGDS) 18, which typically comprises at least a graphics display computer (not shown) and a graphics display (not shown). More generally, the SILS 12, or its modular equivalent, may be incorporated into any cockpit system that has a user interface entailing a display and means for interacting with display elements. Thus, the SILS 12 may be implemented, for example and without limitation, in an MMR, it's display functions in a CGDS 18, its tuning functions in a CDU 96, or a navigation radio tuning panel, and aspects of its aural functions, in a cockpit audio system (not shown).

With respect to displays, in various embodiments as shown in FIG. 4, an aircraft cockpit 70 and the airplane's cockpit graphical display system 18 may include at least one of a Primary Fight Display (PFD) 82, a Navigation Display (ND) 84, a Head-Up Display (HUD) 90, a Multi-Function Display (MFD) 88, a Crew Alerting Display 86, and an Electronic Flight Bag (EFB) display 92, or other displays in the cockpit, a number of which may be configured to host display-related functions of the SILS 12.

As shown in FIG. 1, an SILS 12 is provided to enable interaction between pilots and various airplane systems. The SILS 12 may be coupled or connected to the interfacing systems of FIG. 1. In some embodiments, the term "coupled" may be used to indicate that two or more components are in either direct or indirect (i.e., with an intervening component between them) physical, electrical, communicative (e.g., wireless connection), or logical connection with each other or that two or more elements co-operate or interact with each other. Similarly, the term "connected" may be used to indicate that two or more components are in direct physical, electrical, or communicative contact with each other.

When flight crew execute an SILS-based landing, the flight crew and/or the systems shown in FIG. 1 may interact with the SILS 12 to affect flight operating parameters of the airplane such as speed, thrust, altitude, performance or other aspects related to lateral and vertical navigation. In this regard, the Aircraft Control System 20 (components of the aircraft flight control system not shown) provides real-time flight operating parameter-related information from flight control computers, autopilot and autothrust systems, and selected flight control inputs on the Mode Control Panel (MCP) 94 (shown in FIG. 4). It also receives flight operating parameter commands or settings from the SILS 12, the MCP 94, or other systems and directs them to its component systems, such as for example, the autothrottle and engines, to affect the flight of the airplane in real-time or at a later point in the flight.

Figure 2:
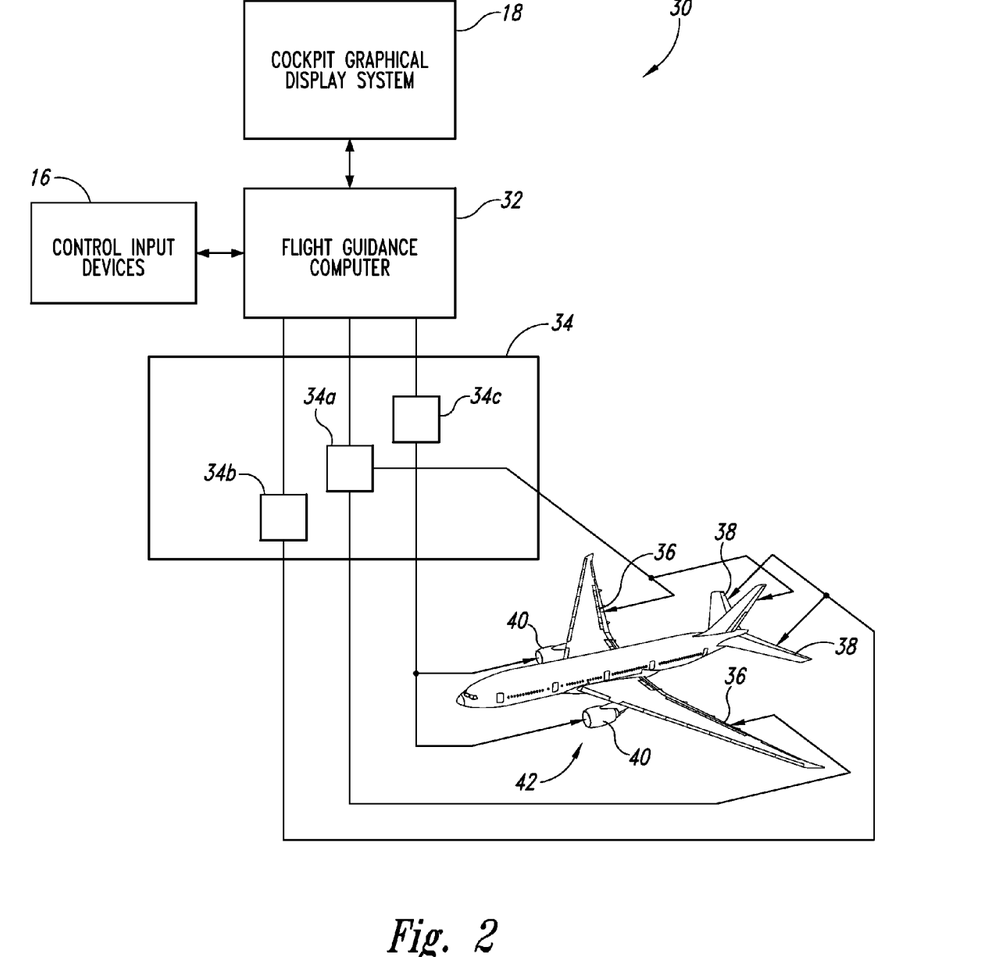
FIG. 2 is an example of an aircraft control architecture that interfaces with aspects of the SILS.

Aspects of the flight control system have been described in further detail previously, an example of which may be found in U.S. Pat. No. 7,460,029, entitled "Systems and Methods for Presenting and Obtaining Flight Control Information". For example, as shown in FIG. 2, a flight guidance system 30 that is an embodiment of Aircraft Control System 20 connected to an SILS 12, may entail display devices such as a Cockpit Graphical Display System 18 or other annunciators (not shown), Control Input Devices 16, a flight guidance computer 32, linked to one or more control systems 34, shown as a lateral/directional motion or roll/yaw control system 34*a*, a vertical motion or pitch control system 34*b*, and an airspeed (or autothrottle/engine) control system 34*c*. The lateral/directional control system 34*a* can be coupled to flight control surfaces affecting lateral and directional control 36, which are typically ailerons and/or rudders of the airplane 42. The vertical motion control system 34*b* can be coupled to pitch control surfaces 38, which are typically the aircraft's elevators. Lastly, the airspeed controller 34*c* can be coupled to the engines 40 of the airplane 42 in some path-based modes of operation, and can be coupled to the elevators in some climb and descent modes of operation. Pilots, for example, may interact with the Aircraft Control System 20 and its components such as the autopilot system 104 shown in FIG. 5, by (1) utilizing radio tuning panels 102 connected to the SILS 12, (2) utilizing the MCP 94, and (3) utilizing the FMS 14 to engage the autopilot for landing, change speed to affect the speed profile of the airplane; change altitude to affect the vertical flight profile; or change waypoints to change the lateral flight path of their airplane in real-time or program the change to execute at a later point in time.

Figure 5:
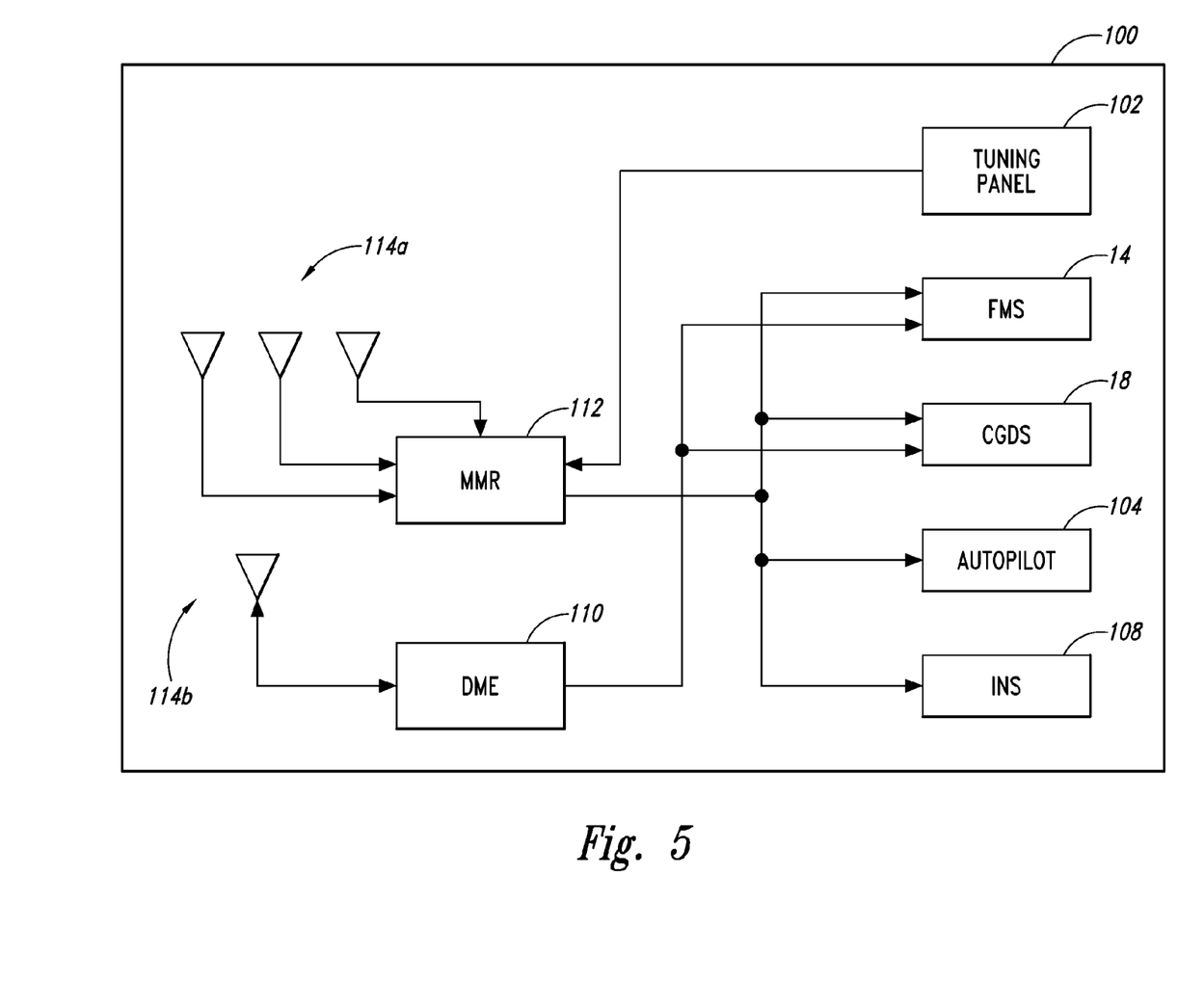
FIG. 5 depicts a generalized standard schematic configuration of an RNP-capable airplane.

Thus, for example and without limitation, when the flight crew is executing a manual or automatic landing, the flight crew may engage ILS portion of the MMR 112 to receive radiated signals from the localizer and glide slope antennas on the ground that can be used to determine the aircraft's position relative to the runway centerline in azimuth and relative to a typical 3-degree descent path in elevation. Accordingly, the MMR 112 is capable of providing to the PFD 82 and the flight guidance system 30, and more specifically the automatic landing portion (autoland) of the autopilot 104, indicators and/or signals corresponding to elevation and azimuth deviation that may be used for guidance to the pilots for manual landing and/or to the autopilot for automatic landing up to and including touchdown and rollout.

Returning to FIG. 1, the Flight Management System (FMS) 14, and its Navigation database (NDB) (not shown) and Aerodynamic and Engine (performance) database (AEDB) (not shown) provide information necessary for navigation along the four-dimensional (4D, including time) flight route for calculating the optimal or desired performance for that flight route. The FMS 14 and its lateral and vertical navigation guidance functions may also utilize information from Navigation System 22, Communication System 24, and Aircraft Flight Control System 20 and display flight management information on a Cockpit Graphical Display System (CGDS) 18.

The Communications System 24 may also be enabled to uplink and downlink information, for example and without limitation, related to flight plans, Air Traffic Control (ATC) instructions for lateral navigation; vertical navigation; speed changes; required time of arrival at a waypoint or required time of arrival at a destination; weather; or Airline Operational Control (AOC) messages such as those related to gate information and updated time of arrival. It may also be engaged in transmitting and receiving coordination messages between aircraft that are engaged in a collaborative Air Traffic Management (ATM) application such as where one aircraft is asked to follow another aircraft at certain distance, time, speed and/or altitude parameters.

Another important system that interacts with FM functions is the airplane's Navigation System 22. Its component systems such as the Global Positioning System (GPS), Multi-Mode Receiver (MMR) Distance Measuring Equipment (DME), VHF Omni-Directional Range (VOR), Air Data and Inertial Reference Unit (ADIRU), Air Traffic Control (ATC) Transponders, Traffic Alert and Collision Avoidance System (TCAS) and/or other traffic computers used for Air Traffic Management (ATM) applications provide FM function-related information as related to, for example and without limitation, the navigation or guidance performance of the aircraft in reference to its flight plan, a navigation station or waypoint, or to some objective as set forth by a procedure such as a Continuous Descent Approach (CDA) or a collaborative Air Traffic Management (ATM) application. In this regard, certain ATM applications may be available as part of the Surveillance System 26. Alternative configurations may also embody ATM applications and certain navigation information in a suitably equipped Electronic Flight Bag (EFB) 28.

In addition, Control Input Devices 16 are provided to enter, accept, and utilize FM function-related information that is available from, without limitation, a communications uplink from Air Traffic Control (ATC) or an Airline Operational Center (AOC) through the Communication System 24, a paper chart, customized airline-specific approach procedure database, or other on-board aircraft systems such as the Aircraft Control System 20, the Flight Management System 14, the Navigation System 22, or the Surveillance System 26. The Control Input Devices 16 may also be utilized to interact with the information displayed cockpit displays in a manner generally similar to that described in U.S. Pat. No. 7,418,319, entitled "Systems and Methods for Handling the Display and Receipt of Aircraft Control Information" and incorporated herein in its entirety by reference.

Lastly, the Control Input Devices 16 may be embodied as a dedicated control panel, radio tuning panel, or as part of another control device on the airplane. For example, and without limitation, the device 16 may be integrated as part of the Control Display Unit (CDU) 96, or as part of another control panel for controlling flight management, navigation or display aspects of the aircraft's systems. Further, the devices 16 may include, without limitation, means known to those skilled in the relevant art such as voice command input, keyboard, keypad, cursor control devices, touch-screen input and line select keys (LSK) or other keys on a CDU 96.

Figure 3:
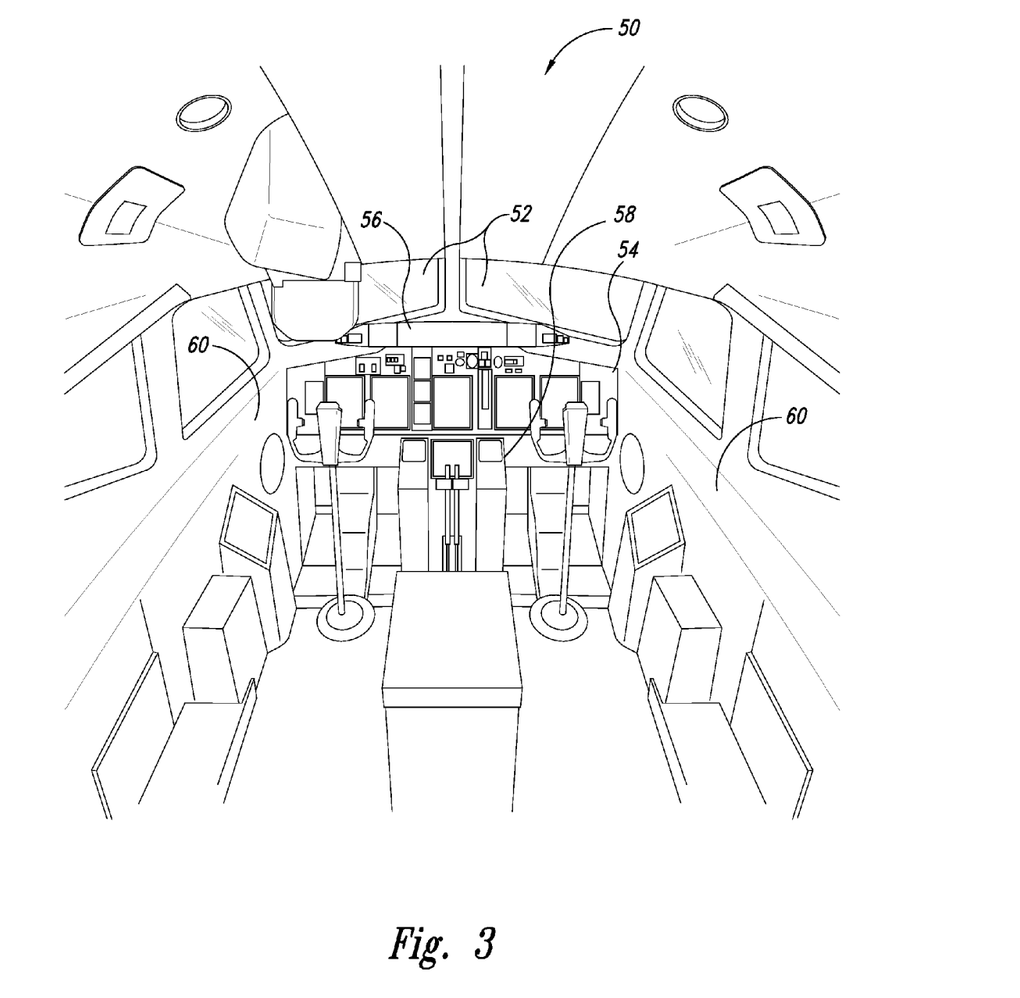
FIG. 3 is a diagram illustrating a general arrangement of an aircraft cockpit.

FIG. 3 illustrates a general arrangement of an aircraft cockpit 50 showing a layout of many of the aircraft systems that interact with, or potentially host, the SILS 12, which are shown in further detail in FIG. 4. The cockpit 50 includes forward windows 52 a plurality of flight instruments on the forward instrument panel 54, a glare shield 56, a control pedestal 58, and sidewalls 60.

FIG. 4 shows a close-up view of the cockpit 70 with a glare shield 76, a forward instrument panel 78, and a control pedestal (also known as a center aisle stand) 80 with various instruments 72 and displays 74. The forward instrument panel 78 and the control pedestal 80 have a number of displays, including multifunction displays 88. As shown here, the multifunction displays 88 include a Navigation Display 84 and a Checklist Display 98. The multifunction display 88 on the control pedestal 80 may also be configured to manage datalink communications or other cockpit functions. In addition, the cockpit has a Head-up Display 90 (an optional, second Head-up display is not shown), a Control Display Unit (CDU) 96, and an Electronic Flight Bag display 92. All of the aforementioned systems, which in display-oriented functional aspects may be part of the Cockpit Graphical Display System 18, can potentially be used in displaying or hosting some or all aspects of SILS 12.

Lastly, a Mode Control Panel (MCP) 94 is positioned on the glare shield 76. The MCP 94 along with the CDU 96 and multifunction displays 88 with interactive capability may be capable of controlling or modifying inputs that influence the flight plan and performance of the airplane.

The above detailed description provides a general overview of the flight deck environment with which and in which the methods, systems, and devices of this disclosure operate. Turning now to more specific aspects of the disclosure, FIG. 5 depicts a more detailed schematic 100 of the systems as well as their inter-wiring (interconnections) that enable the capabilities of the SILS 12. The schematic 100 shows a radio tuning panel 102 for tuning ILS frequencies, and for SILS-capable aircraft, for tuning SILS frequencies, an FMS 14, a CGDS 18, an autopilot 104, an Inertial Navigation System (INS) 108, a DME 110, MMR 112, and various antennae 114a-114b for the MMR 112 and DME 110 respectively.

The embodiment shown in FIG. 5 is currently substantially standard inter-wiring for an RNP-capable airplane. Those skilled in the relevant art understand how the configuration of FIG. 5 is implemented and functions, and thus a detailed discussion of FIG. 5 is not required. For example, most large commercial airplane manufacturers offer one or more aircraft types with systems configured substantially similarly to that of FIG. 5. Those skilled in the relevant art will also appreciate that neither all the systems nor all the inter-wiring between the relevant systems are shown as they are not necessary in order to teach the disclosure. In this instance, while power connections, switches, and system redundancies are not shown, those skilled in the art can extend the embodiment of FIGS. 5-6 to apply it to a particular airplane installation, for example, with left/right/center MMRs, autopilots, INS, and the like.

As described earlier in the disclosure, one significant challenge is that the addition of SILS 12 capability can affect a number of important airplane systems, for example and without limitation, such as the FMS 14, the CGDS 18, the autopilot 104, the Inertial Navigation System (INS) 108, the DME 110, and the MMR 112. In addition, the inter-wiring between the aforementioned systems may also be significantly affected.

Figure 6:
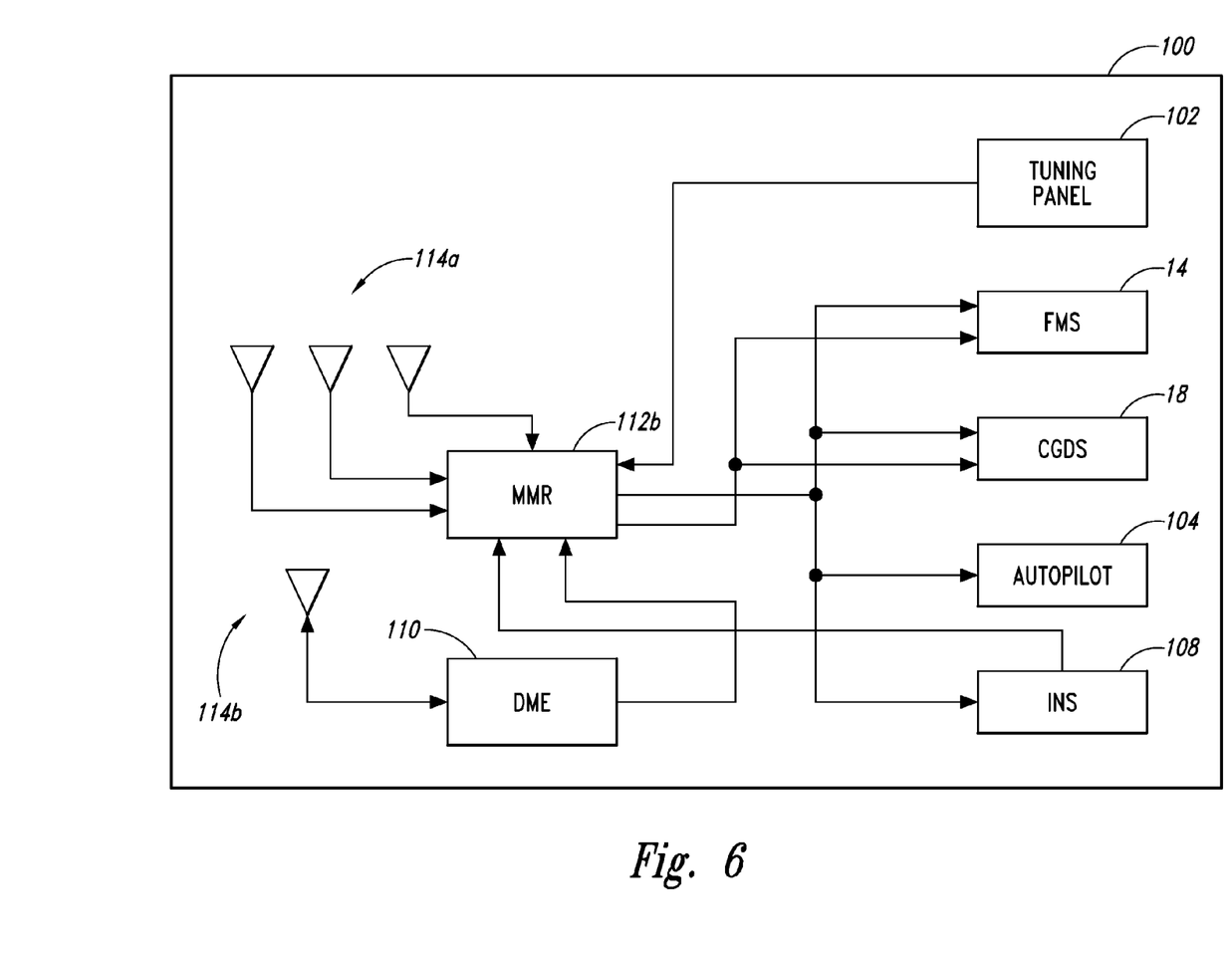
FIG. 6 shows a schematic configuration of preferred embodiment of this disclosure that implements SILS capability.

A preferred embodiment that addresses these challenges, again not including system redundancies and redundant/alternate inter-wiring, is depicted in FIG. 6. This embodiment implements SILS-capability while minimizing changes to the systems shown in FIG. 5 and their inter-wiring. In this embodiment, certain SILS-capabilities discussed below are incorporated into the modified MMR 112b, thereby leaving all of the other systems shown in FIG. 5 unchanged. (Note: Although it may be clear to those skilled in the art the context in which MMRs are referenced in this detailed description, for readability purposes and for distinguishing between the current MMR, the "modified MMR" will be called out as MMR 112b. Accordingly, references to the MMR 112b should be understood as MMRs having SILS-capability.) Furthermore, wiring changes are limited to (1) connection from the INS 108 to the MMR 112b; (2) connection from the DME 110 to the MMR 112b; and (3) an additional connection from the MMR 112b to the FMS 14.

Accordingly, the systems, methods, and apparatus of this disclosure affect primarily one system—the MMR—and the aforementioned aircraft wiring reconfiguration while leaving most of the other airplane systems as well as pilot (flight crew) training substantially unaffected. Unlike existing techniques for introducing new precision approach capabilities that are based on a classical method of new capability integration by providing associated new landing modes that are uniquely identified, the disclosure provides only a single ILS-like landing mode to the pilot by moving all mode-specific functionality to onboard computers such as MMRs.

Accordingly, the MMR 112b will produce (1) deviations that look just like ILS deviations on cockpit displays and (2) DME signal output that corresponds to the distance to the runway facility that is normally produced during an ILS, SLS, or GLS operation. Consequently, the FMS 14, CGDS 18, autopilot 104, INS 108, DME 110, and other downstream systems such as but not limited to the flight data recorder (not shown), and every other downstream system will simply operate as if there were an ILS on the ground providing the guidance.

This preferred embodiment of the disclosure imparts a unique combination of airborne functionality, operational charting, frequency assignment and an approach selection algorithm to "wrap around" a GNSS-based precision approach and allow legacy ILS airplane to fly those approaches with minimal changes to the airplane. Some significant aspects of the disclosure include: (1) an adapter interface primarily implemented as a non-transitory computer readable medium between the new systems (i.e. GBAS and SBAS) and legacy ILS realized by an integration of new and existing airplane capabilities in conjunction with operational conventions; (2) mapping of SILS frequencies to GLS or SLS channel numbers in an on-board database; (3) routing of DME information through the MMR so that the distance to the runway calculation can be output as a "synthetic DME"; (4) approach selection algorithm for proper interpretation of an input frequency as either an ILS or SILS depending on current aircraft position relative to the locations of ILS and SILS approaches carried in an onboard database; (5) standard identifiers (e.g., "XXXX" or "FAIL") or set of standard identifiers as a mode status/failure indication; and (6) use of synthesized audio voice annunciators to cover mode dependent status/failure indications not already covered by existing ILS mode status/failure indicators.

The substantial similarity with an ILS approach starts with an SILS chart that looks substantially like an ILS approach chart with which pilots have working familiarity. By the way of an example and not limitation, on an SILS approach chart, instead of an ILS frequency, an SILS frequency will be listed along with an approach identifier and associated Morse code for the identifier just like a normal ILS approach. However, as there is no actual ILS facility broadcasting on that frequency at the indicated location, the frequency used to select the approach will initiate an SILS approach.

Figure 7:
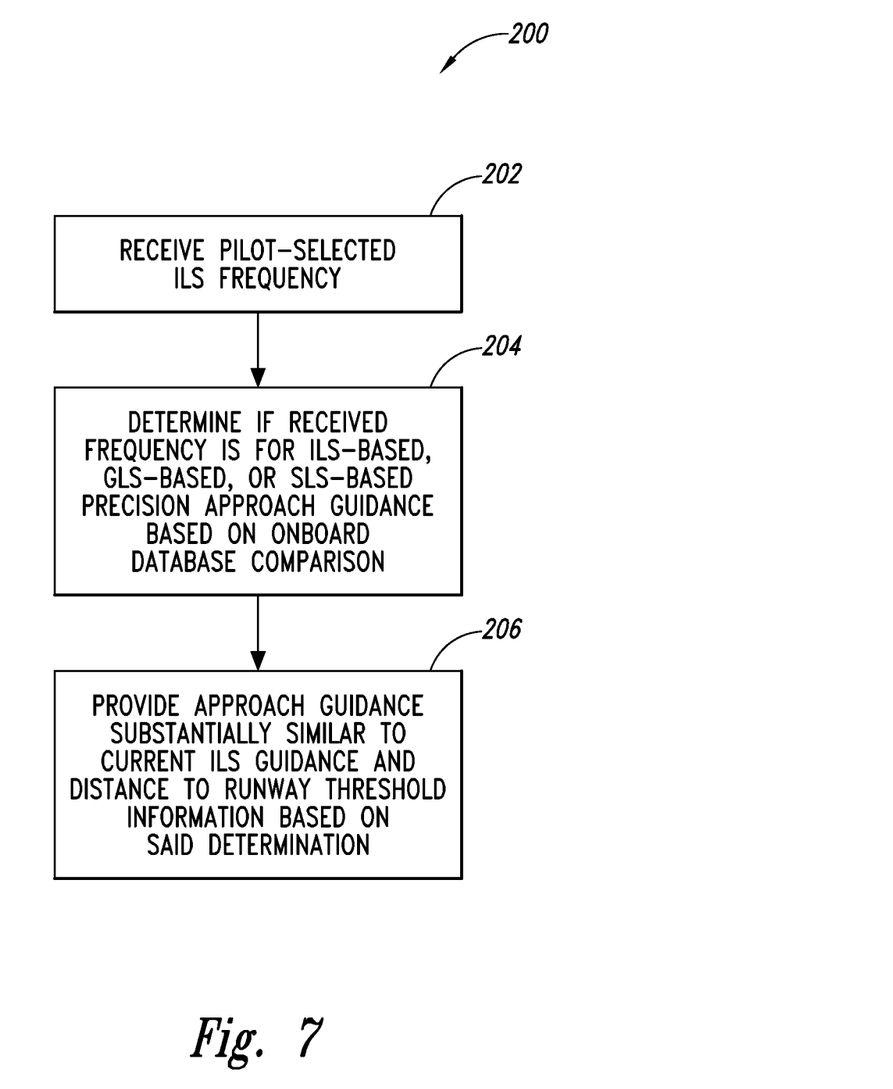
FIG. 7 is a flow chart of an example of a method by which an advantageous embodiment of the disclosure may be implemented.

The process of conducting the SILS approach as shown in FIG. 7 is substantially implemented in the MMR 112b with ILS, GBAS, and/or SBAS capabilities. Here, it is important to note that this approach and its underlying basic concept can be extended to any xLS type guidance such as MLS or any landing mode that supports approach selection through a frequency or channel number that could be mapped to an SILS frequency. The MMR 112b will receive the flight crew-selected (pilot-selected) frequency from a tuning panel 102 and compare it against a list of all ILS's and Synthetic ILS's listed in an onboard database. In some embodiments, the comparison may only be needed for the list of synthetic ILS'. While the onboard database may be on any onboard computer, it is preferably part of the MMR 112b. The MMR 112b will decide based on the proximity of the current airplane position to the facility whether the selected frequency is for an ILS or SILS approach based on a selection algorithm or method further described below.

If the selection algorithm determines the flight crew-selected frequency is an ILS frequency, then the current or legacy ILS guidance is provided. However, if the selection algorithm determines the selected frequency is an SILS frequency, the MMR 112b checks the onboard database and determines whether a five-digit channel number has been paired with the selected frequency for that location. If a five-digit channel number has been paired with the selected frequency for that geographic location, then selection proceeds as normal for a GBAS or SBAS approach.

If the five-digit channel number corresponds to a GBAS approach (i.e. in the range of 20000 to 39999), then the MMR 112b will tune the associated VHF Data Broadcast (VDB) frequency and start looking for the Final Approach Segment (FAS) data block that matches the channel number. If it is a channel number in the range associated with an SBAS LPV (or SLS) approach (i.e. in the range of 40000 to 99999), then the MMR 112b will look in the database to find the FAS data block associated with the channel number.

In either the GBAS or SBAS LPV case, the MMR 112b will find the identifier in the selected FAS data block and output the identifier both digitally and as an audio Morse code signal, just as an ILS receiver would do (Note: The MMR 112b also outputs identification in ILS mode in the same way). In some embodiments, the identifier may also be available as synthesized voice output.

Lastly, in either the GBAS or SBAS LPV case, the MMR 112b, based on knowledge of the airplane's position and the selected frequency, will produce lateral and vertical deviations guidance to be used by the autopilot 104 and the CGDS 18. The displayed guidance indicators for both cases will look just like ILS deviations on cockpit displays such as the PFD 82 that provided for ILS approaches. Thus, the SILS 12 makes it possible for flight crew to execute the approach and landing for a GBAS or SBAS LPV cases in the same manner as they would for the ILS approach and landing.

To summarize, just as in the ILS approach case discussed earlier, for both the GBAS and SBAS LPV cases, the MMR 112b is capable of providing to the PFD 82 and the flight guidance system 30, and more specifically the automatic landing portion (autoland) of the autopilot 104, indicators and/or signals corresponding to elevation and azimuth deviation that may be used for guidance to the pilots for manual landing and/or to the autopilot for automatic landing up to and including touchdown and rollout.

Turning now to the processing of distance to the approach runway, in an embodiment, the systems, methods, and apparatus of this disclosure will process distance to a runway facility wherein the distance to the runway facility is one of a distance to a DME antenna near a localizer antenna of the runway facility or a distance to the threshold of the runway facility for the precision approach. Accordingly, the MMR 112*b* may produce a DME signal output that corresponds to the distance to the threshold information that is normally produced during an SLS or GLS operation.

One method of producing a DME signal output from the MMR 112*b* is to re-route the DME 110 output from the DME 110 through the MMR 112*b* as shown in FIG. 6. Again, to avoid prolixity and because those skilled in the art are familiar with how to address such rerouting that may affect non-autoland modes of, for example, the autopilot, discussion of such rerouting to address other systems and functions is not discussed.

In the embodiment of FIG. 6, when the pilot's frequency selection results in selection of an ILS, all the DME distance information (e.g. ARINC labels) are passed through undisturbed; i.e., the MMR function is just effectively switched out of the signal path. However, if the pilot's frequency selection results in the selection of a GLS or an SLS approach, then the MMR looks at all of the DME labels on the DME data bus (i.e. connection from the DME to the MMR) and replaces the labels that are associated with the selected DME frequency with labels that contain the appropriate range/distance for the GLS or SLS approach. Since the airplane doesn't know the difference between an ILS and SILS approach outside of the MMR 112*b*, it is assumed the DME 110 will receive the ILS frequency label and tune the associated DME as if were a real ILS. There may or may not in fact be a DME within range at that frequency, and thus the DME 110 may or may not be producing valid measurements.

By the way of an example and not a limitation, DME 110 receivers may track and provide ranges to multiple DME's at any given time. The FMS 14 system may be managing DME tuning in order to support FMS RNAV requirements as well as to support the SILS approach. In accordance with ARINC 709, the data output by the DME 110 should be organized such that each frequency word (e.g., label 035) is followed by the distance words (e.g., labels 201 and 202) for the associated DME. This enables DME 110 downstream equipment to correlate distance and frequency. Therefore, the MMR 112*b* must only replace the sets of label 035, 201 and 202 that correspond to the DME that maps to the frequency associated with the SILS approach selection and let all the other labels pass by unmodified.

To maintain consistency with other airplane functions such as FMS RNAV, the location of the synthetic DME (non-physical DME) will need to be coded into the onboard database as the threshold position rather than the position of a physical DME. These synthetic DME's should appear in the database as a terminal area DME. The synthetic DME will require an Identifier assignment that must be unique relative to any other DME that could conceivably be received with that tuning anywhere within radio range.

Thus, for example and without limitation, an embodiment of an onboard method of providing distance to a runway facility for a precision approach may comprise: (1) tuning an onboard DME receiver; processing distance as provided by the DME receiver; (3) determining whether the precision approach is an ILS approach or an SILS approach based on the selected frequency where the selected frequency is an ILS frequency or an SILS frequency; (4) passing through DME-calculated distance for an ILS approach; (5) responsive to the determination that the precision approach is not an ILS approach, calculating a synthetic DME distance to the runway facility; and (6) displaying the distance to the runway facility on at least one cockpit display. The method may further include coding an onboard database with DME information and synthetic DME information wherein the synthetic DME is a non-physical terminal DME providing runway threshold information. As discussed above, distance to a runway facility may be a distance to a DME antenna near a localizer antenna of the runway facility or a distance to the threshold of the runway facility for the precision approach.

In summary, the MMR 112*b* will produce (1) deviations that look just like ILS deviations on cockpit displays and (2) DME signal output that corresponds to the distance to the runway facility that is normally produced during an ILS, SLS, or GLS operation. Consequently, the displays, autopilot, flight data recorder, and every other downstream system will simply operate as if there were an ILS on the ground providing the guidance.

FIG. 7 depicts a general method 200 by which the disclosure may be implemented. The processing and display of textual and graphical information on cockpit display systems such as those utilized by pilots in a modern aircraft display system, including the handling of certain information such as those associated with precision approaches have been previously implemented in industry. Those skilled in the relevant art would understand how such processing and display would be accomplished on aircraft systems, and that the depiction herein is one of several possible methods of implementing the methods, systems, and devices of this disclosure.

Those of ordinary skill in the art will appreciate that SILS 12 can be implemented on almost all transport aircraft. It should be appreciated that the logical operations described herein are implemented (1) as a sequence of computer implemented acts or program modules running on a computing system such as an SILS or computer and/or (2) as interconnected machine logic circuits or circuit modules within the computing system. The implementation is a matter of choice dependent on the performance and other requirements of the computing system. Accordingly, the logical operations described herein are referred to variously as steps, operations, or acts. These states, operations, or acts may be implemented in software, in firmware, in special purpose digital logic, and any combination thereof. It should also be appreciated that more or fewer operations may be performed than shown in the figures and described herein. These operations may also be performed in a different order than those described herein.

As will be appreciated by one of skill in the art, the present disclosure may be embodied as a method, system, apparatus, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Now referring to FIG. 7, the method receives 202 pilot-selected a frequency to be used for a precision approach, in current nomenclature known as ILS frequency, from a tuning panel 102, the FMS 14, or other control input device 16. Next, the method determines 204 if the received frequency is for an ILS-based, GLS-based, or SLS-based precision approach guidance based on a comparison of the received frequency to a plurality of SILS frequencies stored on an onboard database. This determination step 204 may be implemented as a selection algorithm or criteria that considers factors such as but not limited to the airplane's position in conjunction with the information available from the database. Lastly, based on the determination of step 204, the method provides 206 approach guidance substantially similar to current ILS approach guidance as well as distance to runway threshold information.

The approach guidance may, for example and without limitation, include a glide slope deviation indicator, a localizer deviation indicator, mode and status annunciators, and other related display elements. Thus, for example, a pilot who is trained to understand and operate and airplane with glide slope and localizer deviation indicators for an ILS-based approach will operate the tuning panel 102 and get guidance from the cockpit systems with substantially the same and familiar indicators for an ILS-based approach when he or she is executing a GLS-based or SLS-based precision approach. The precision approach guidance of the general method 200 that is displayed on, for example and without limitation, the PFD 82 may also be provided to the flight guidance system 30, and more specifically the automatic landing portion (autoland) of the autopilot 104, as indicators and/or analog or digital signals corresponding to elevation and azimuth deviation that can be used for automatic landing up to and including touchdown and rollout.

Figure 8:
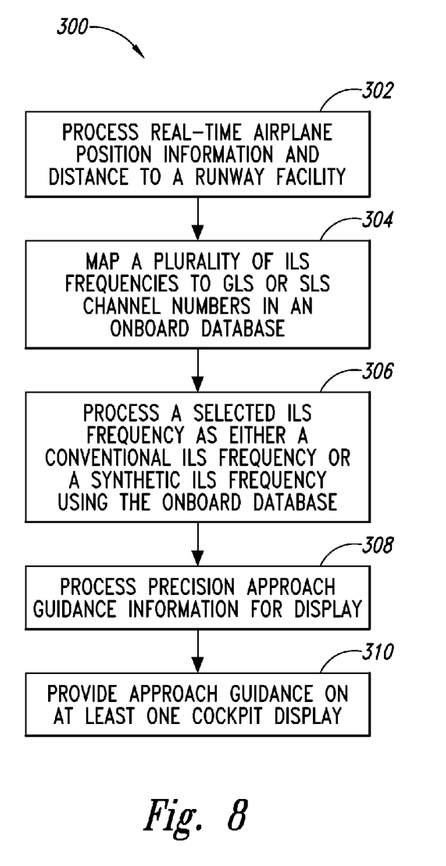
FIG. 8 is a flow chart of another example of a method for precision approach guidance.

Turning now to FIG. 8, another example of a method 300 for precision approach guidance for an aircraft is provided. In step 302, the method processes real-time airplane position information and distance to a runway facility. Next, in step 304, the method maps a plurality of ILS frequencies (i.e., in current nomenclature known as ILS frequency but in this instance it is a pilot-selected frequency for a precision approach which could be an ILS or an SILS frequency) to GLS or SLS channel numbers in an onboard database. The method then processes 306 the pilot-selected ILS frequency as either a conventional ILS frequency or a synthetic ILS frequency using the onboard database. Step 306 may, for example and without limitation, use a selection algorithm that utilizes factors such as the airplane's position in conjunction with the data stored in the onboard database. In step 308, the method processes precision approach guidance information for display in the form of, for example, lateral and vertical deviation guidance for the ILS or SILS approach. Lastly, as described earlier in this detailed description, the method provides 310 approach guidance on at least one cockpit display such as a PFD 82, and as previously discussed, to the autoland portion of the autopilot 104.

In the steps of method 300, processing the precision approach guidance information may further comprise tuning a synthetic ILS frequency to find the Final Approach Segment (FAS) data block for at least one of a GLS or SLS approach. As described earlier, the approach guidance comprises substantially of ILS-like deviation indicators. The processing of distance to the runway facility may be a pass-through process wherein the distance is provided as calculated by the DME receiver (i.e., distance to a DME antenna near a localizer antenna of the runway facility) or it may be a replacement process wherein the distance is calculated distance to the runway threshold of the runway facility as calculated by the MMR 112b. The method 300 may also further comprise indicating a correct approach selection via an indication of an approach identifier to a pilot on at least one of a cockpit display system and a cockpit audio system.

Figure 9:
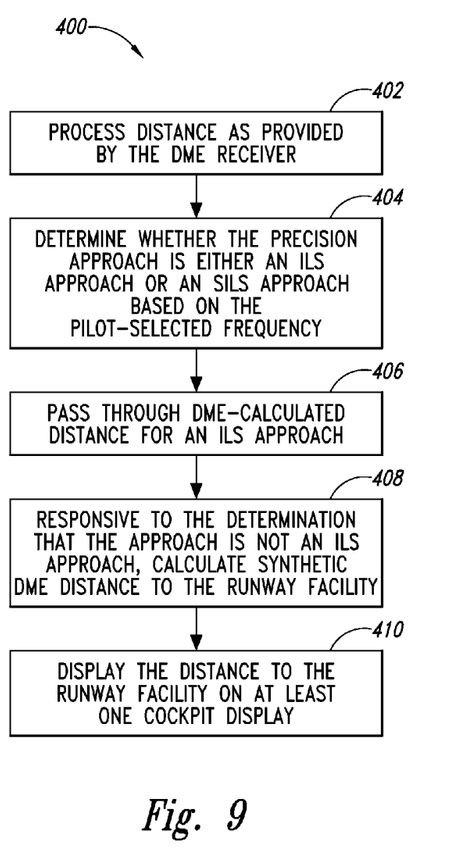
FIG. 9 is a flow chart of a method of providing distance to a runway facility for a precision approach.

Lastly, FIG. 9 depicts an onboard method 400 for providing distance to a runway facility for a precision approach. In step 402, the method processes distance as provided by the DME 110. Next, the method determines 404 whether the precision approach is an ILS approach or an SILS approach based on the pilot-selected frequency, where the pilot-selected frequency may be an ILS frequency or an SILS frequency. If the method determines the approach is an ILS approach, the method passes through 406 the DME-calculated distance (i.e., distance to a DME antenna near a localizer antenna of the runway facility) as provided by the DME 110. If the method determines that the precision approach is not an ILS approach, it calculates 408 a synthetic DME distance to the runway facility (i.e., distance to the runway threshold of the runway facility). In step 410, the method displays the distance to the runway facility corresponding to the approach determined by step 404 and calculated accordingly in step 406 or 408 on at least one cockpit display such as a PFD 82. In some embodiments, the method may also provide the distance information to the autoland portion of the autopilot 104. Lastly, the method 400 may further comprise coding an onboard database with DME information and synthetic DME information wherein the synthetic DME is a non-physical terminal DME providing runway threshold information.

The subject matter described above and in the appendix is provided by the way of illustration only and should not be construed as limiting. While preferred embodiments have been described above and depicted in the drawings, other depictions of data tags and graphics symbology can be utilized in various embodiments of the disclosure. Accordingly, the disclosure is not limited except as defined by the claims.

APPENDIX I

Synthetic Instrument Landing System (SILS)

| Acronym | Definition |
|---|---|
| ARINC | Aeronautical Radio Inc. - ARINC Standards for Avionics form, fit and function are developed by the Airline Electrical Engineering Committee which is sponsored by the company ARINC. |
| CAT I | Category I - A type of precision approach procedure with a decision altitude not lower than 200 ft. |
| CAT II | Category II - A type of precision approach procedure with a decision altitude not lower than 100 ft. |
| CRC | Cyclic Redundancy Check - A cyclic redundancy check is an to raw error-detecting code designed to detect accidental changes computer data, and is commonly used in digital networks and storage devices such as hard disk drives. The integrity of data defining GNSS-based precision approaches is protected by a CRC. |
| DME | Distance Measuring Equipment - is a transponder-based radio navigation technology that measures distance by timing the propagation delay of UHF radio signals. |
| FAS | Final Approach Segment - A path in space defined by a small set of data stored in a FAS data block. |
| FMCS | Flight Management Computer System |
| FMS | Flight Management System |
| GBAS | Ground Based Augmentation System - A system that supports GNSS augmentation through the use of terrestrial radio messages. |
| GLS | GBAS landing System - An airplane approach and landing function based on GBAS. |
| GNSS | Global Navigation Satellite System - Standard generic term for satellite navigation systems ("sat nav") that provide autonomous geo-spatial positioning with global coverage. ICAO defines GNSS as the combination of cores satellite constellations such as the US GPS and augmentation system such as SBAS and GBAS. |
| GPS | Global Positioning System - US satellite navigation system |
| ICAO | International Civil Aviation Organization - Branch of the United Nations responsible for developing and maintaining Standards and Recommended Practices for Civil Aviation to promote safety and interoperability. |
| ILS | Instrument Landing System - An instrument landing system (ILS) is a ground-based instrument approach system that provides precision guidance to an aircraft approaching and landing on a runway, using a combination of radio signals. In this paper ILS refers to the specific ICAO standardized Localizer and Glideslope combination. |
| INS | Inertial Navigation System - Aircraft system that provides measurement of body angle (i.e. pitch roll and heading) and body accelerations and velocities. An INS may also provide an indication of position in Lat, Lon and Altitude. |
| LAAS | Local Area Augmentation System - LAAS is the US version of a GBAS. |
| LPV | Localizer Performance with Vertical guidance - Localizer performance with vertical guidance (LPV) are the highest precision GPS (WAAS enabled) aviation instrument approach procedures currently available without specialized aircrew training requirements, such as required navigation performance (RNP). Landing minima are similar to those in an instrument landing system (ILS), that is, a decision altitude of 200 feet and visibility of ½ mile. |
| MMR | Multi-Mode Receiver - Avionics receiver that integrates ILS, GPS, GLS and SLS functionality. |
| NCD | No Computed Data - Code contained in the sign status matrix bits of an ARINC 429 data word that indicates any data in the word should not be trusted. |
| RF | Radio Frequency |
| RNAV | Random Navigation or Area Navigation - Area Navigation (RNAV) is a method of Instrument Flight Rules (IFR) navigation that allows an aircraft to choose any course within a network of navigation beacons, rather than navigating directly to and from the beacons. This can conserve flight |

APPENDIX I-continued

Synthetic Instrument Landing System (SILS)

| Acronym | Definition |
|---|---|
| | distance, reduce congestion, and allow flights into airports without beacons. |
| RNP | Required Navigation Performance - is a type of performance-based navigation (PBN) that allows an aircraft to fly a specific path between two 3-dimensionally defined points in space. RNAV and RNP systems are fundamentally similar. The key difference between them is the requirement for on-board performance monitoring and alerting. |
| RTCA | RTCA Inc. - (known as Radio Technical Commission for Aeronautics until their re-incorporation in 1991 as a not-for-profit corporation) is a volunteer organization that develops technical guidance for use by government regulatory authorities and by industry. |
| SBAS | Satellite Based Augmentation System - a system that supports wide-area or regional augmentation through the use of additional satellite-broadcast messages. |
| SILS | Synthetic ILS - The concept described in this paper |
| SLS | Satellite Landing System - An airplane approach and landing function based on SBAS. This is closely related to the term LPV. However, LPV refers to the procedure type and service, while SLS refers to the airplane level function based on use of the service type. |
| US | United States |
| VDB | VHF Data Broadcast - Datalink component of the ICAO standardized GBAS |
| WAAS | Wide Area Augmentation System - WAAS is the US version of and SBAS |

I claim:

1. A Synthetic Instrument Landing System (SILS) device operatively coupled to an aircraft display, comprising:
   means for receiving a frequency to be used for a precision approach;
   means for mapping a plurality of Synthetic Instrument Landing System (SILS) frequencies to Ground Based Augmentation System (GBAS) Landing System (GLS) and to Satellite Landing System (SLS) channel numbers stored in an onboard database;
   means for comparing the received frequency to the plurality of mapped SILS frequencies of the onboard database;
   means for finding a match between the received frequency and the plurality of mapped SILS frequencies of the onboard database;
   means for selecting an SILS approach based the matched SILS frequency of the onboard database and a current aircraft position relative to the precision approach; and
   means for providing ILS-like deviations on at least one cockpit display based on said selection.

2. The device of claim 1 wherein the means for providing ILS-like deviations provide an approach identifier to a pilot on at least one of a cockpit display system.

3. The device of claim 1 wherein the means for selecting an SILS approach further comprises means for finding a Final Approach Segment (FAS) data block for either a GLS or an SLS approach.

4. The device of claim 1 further comprising means for processing distance to a runway facility wherein distance to a runway facility is one of a distance to a Distance Measuring Equipment (DME) antenna near a localizer antenna of the runway facility or a distance to the threshold of the runway facility for the precision approach.

5. The device of claim 4 wherein the means for processing distance to a runway facility are resident in a Multi-Mode Receiver (MMR).

6. An airplane system for precision approach guidance comprising:
   a programmable computer having instructions stored in memory that perform a method that includes:
   receiving a frequency to be used for a precision approach;
   determining real-time airplane position information and distance to a runway facility;
   mapping a plurality of Synthetic Instrument Landing System (SILS) frequencies to Ground Based Augmentation System (GBAS) Landing System (GLS) and Satellite Landing System (SLS) channel numbers of an onboard database;
   matching the received frequency using said mapping of SILS frequencies to GLS or SLS channel numbers of the onboard database;
   selecting an SILS approach for the precision approach responsive to finding a match between the received frequency and an SILS frequency from a plurality of SILS frequencies; and
   determining precision approach guidance information based on the selected SILS approach and the real time airplane position; and
   providing a display system operatively connected to the programmable computer for displaying the precision approach guidance information wherein the displaying includes providing ILS-like precision guidance on at least one cockpit display.

7. The system of claim 6 wherein processing the precision approach guidance information further comprises finding a Final Approach Segment (FAS) data block for either a GLS or an SLS approach.

8. The system of claim 6 wherein the approach guidance comprises providing ILS-like deviation and distance to a runway facility further wherein distance to the runway facility is one of a distance to a Distance Measuring Equipment (DME) antenna near a localizer antenna of the runway facility or a distance to the threshold of the runway facility for the precision approach.

9. The system of claim 6 wherein the approach guidance further comprises at least one standard identifier of a plurality of standard identifiers as mode status and failure indication on a cockpit display system.

10. The system of claim 6 wherein the method further comprises indicating a correct approach selection via an indication of an approach identifier to a pilot on at least one of a cockpit display system and a cockpit audio system.

11. The system of claim 6 wherein processing the received frequency further comprises using a selection algorithm based on a current airplane position and the onboard database.

12. A method for precision approach guidance for an aircraft, the method implemented in a Synthetic Instrument Landing System (SILS) of a Multi-Mode Receiver (MMR), comprising:
   receiving a frequency to be used for a precision approach;
   determining real-time airplane position information and distance to a runway facility;
   mapping a plurality of Synthetic Instrument Landing System (SILS) frequencies to Ground Based Augmentation System (GBAS) Landing System (GLS) and Satellite Landing System (SLS) channel numbers of an onboard database;
   matching the received frequency using said mapping of SILS frequencies to GLS and SLS channel numbers of the onboard database;
   selecting an SILS approach for the precision approach responsive to finding a match between the received frequency and an SILS frequency from the plurality of SILS frequencies;

determining precision approach guidance information based on the selected SILS approach and the real-time airplane position; and displaying the precision approach guidance information wherein the displaying includes providing ILS-like precision approach guidance on at least one cockpit display.

13. The method of claim 12 wherein processing the precision approach guidance information further comprises finding a Final Approach Segment (FAS) data block for either a GLS or an SLS approach.

14. The method of claim 12 wherein processing the received frequency further comprises using a selection algorithm based on a current airplane position and the onboard database.

15. The method of claim 12 wherein the ILS-like precision approach guidance comprises of ILS-like deviation and distance to the runway facility.

16. The method of claim 12 wherein processing distance to runway facility is a pass-through process further wherein the distance to runway facility is provided as calculated by a Distance Measuring Equipment (DME) receiver.

17. The method of claim 12 wherein processing distance to runway facility is a replacement process further wherein distance to runway facility is a calculated distance to a runway threshold.

18. The method of claim 12 further comprising indicating a correct approach selection via an indication of an approach identifier to a pilot on at least one of a cockpit display system and a cockpit audio system.

19. The method of claim 12 further comprising providing approach guidance information to an autopilot.

\* \* \* \* \*